US010971281B2

(12) United States Patent
Lin et al.

(10) Patent No.: US 10,971,281 B2
(45) Date of Patent: Apr. 6, 2021

(54) CONDUCTING POLYMER COMPOSITE CONTAINING ULTRA-LOW LOADING OF GRAPHENE

(71) Applicants: Yi-jun Lin, Taoyuan (TW); Bor Z. Jang, Centerville, OH (US)

(72) Inventors: Yi-jun Lin, Taoyuan (TW); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 20 days.

(21) Appl. No.: 16/200,941

(22) Filed: Nov. 27, 2018

(65) Prior Publication Data

US 2020/0168356 A1 May 28, 2020

(51) Int. Cl.
*H01B 1/18* (2006.01)
*C08K 3/04* (2006.01)
*C08K 9/04* (2006.01)
*H01B 13/00* (2006.01)
*C08J 3/20* (2006.01)

(52) U.S. Cl.
CPC ............ *H01B 1/18* (2013.01); *C08J 3/203* (2013.01); *C08K 3/042* (2017.05); *C08K 9/04* (2013.01); *H01B 13/0016* (2013.01); *C08K 2201/001* (2013.01); *C08K 2201/011* (2013.01)

(58) Field of Classification Search
CPC ..... C08J 3/128; C08J 3/203; C08K 2201/001; C08K 2201/011; C08K 3/042; C08K 9/04; H01B 13/0016; H01B 1/18; H01B 1/24
See application file for complete search history.

(56) References Cited

U.S. PATENT DOCUMENTS

| 7,071,258 | B1 | 7/2006 | Jang et al. | |
| 10,259,923 | B1 * | 4/2019 | Phillips | H01B 1/24 |
| 10,294,375 | B2 * | 5/2019 | Asay | C09D 5/24 |
| 10,535,445 | B2 * | 1/2020 | Lonjon | H01B 1/24 |
| 2007/0131915 | A1 * | 6/2007 | Stankovich | H01B 1/24 |
| | | | | 252/511 |
| 2007/0284557 | A1 * | 12/2007 | Gruner | B82Y 40/00 |
| | | | | 252/500 |
| 2010/0000441 | A1 * | 1/2010 | Jang | C09D 11/30 |
| | | | | 106/31.13 |
| 2014/0212656 | A1 * | 7/2014 | Rudhardt | C01B 32/182 |
| | | | | 428/323 |
| 2015/0315449 | A1 * | 11/2015 | Kim | B82Y 30/00 |
| | | | | 165/185 |

(Continued)

FOREIGN PATENT DOCUMENTS

WO    WO-2014070346 A1 *  5/2014  ........... C01B 32/184

OTHER PUBLICATIONS

Anderson et al., "The Use of Esters of N-Hydroxysuccinimide in Peptide Synthesis" J. Amer. Chem. Soc. (1964) vol. 86, No. 9, pp. 1839-1842.

(Continued)

*Primary Examiner* — Mark Kopec
*Assistant Examiner* — Jaison P Thomas

(57) ABSTRACT

A polymer matrix composite containing graphene sheets homogeneously dispersed in a polymer matrix wherein the polymer matrix composite exhibits a percolation threshold from 0.0001% to 0.1% by volume of graphene sheets to form a 3D network of interconnected graphene sheets or network of electron-conducting pathways.

31 Claims, 5 Drawing Sheets

(56) References Cited

U.S. PATENT DOCUMENTS

2016/0115293 A1* 4/2016 Aksay .................... C08L 67/00
                                                                524/496
2017/0166722 A1* 6/2017 Zhamu .................... B05D 1/02
2018/0346689 A1* 12/2018 Chen ........................ C08K 7/24

OTHER PUBLICATIONS

Hummers, "Preparation of graphitic oxide" J. Am. Chem. Soc. (1958) vol. 80, p. 1339.
Jang et al., "Processing of Nano Graphene Platelets (NGPs) and NGP Nanocomposites: A Review" J. Materials Sci. (2008) vol. 43, pp. 5092-5101.

* cited by examiner 500 nm

CONDUCTING POLYMER COMPOSITE CONTAINING ULTRA-LOW LOADING OF GRAPHENE

FIELD OF THE INVENTION

The present invention relates to the art of graphene materials and, in particular, to an environmentally benign method of producing electrically conducting graphene-polymer composite containing a low proportion (0.0001%-1.0% by weight) of isolated graphene sheets homogeneously dispersed in a polymer matrix.

BACKGROUND

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nanographene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, and chemically functionalized graphene.

Our research group was among the first to discover graphene [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were reviewed by us [Bor Z. Jang and A Zhamu, "Processing of Nano Graphene Platelets (NGPs) and NGP Nanocomposites: A Review," J. Materials Sci. 43 (2008) 5092-5101].

The primary approach to production of graphene oxide is based on the intercalation and oxidation of graphite, as illustrated in FIG. 1. This approach entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d=½ d_{002}=0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this conventional chemical production process:

(1) The process requires the use of large quantities of several undesirable chemicals, such as sulfuric acid, nitric acid, and potassium permanganate or sodium chlorate.
(2) The chemical treatment process requires a long intercalation and oxidation time, typically 5 hours to five days.
(3) Strong acids consume a significant amount of graphite during this long intercalation or oxidation process by "eating their way into the graphite" (converting graphite into carbon dioxide, which is lost in the process). It is not unusual to lose 20-50% by weight of the graphite material immersed in strong acids and oxidizers. This is also a main reason why an excessively large amount of concentrated acid and oxidizer is required.
(4) The thermal exfoliation requires a high temperature (typically 800-1,200° C.) and, hence, is a highly energy-intensive process.
(5) Both heat- and solution-induced exfoliation approaches require a very tedious washing and purification step. For instance, typically 2.5 kg of water is used to wash and recover 1 gram of GIC, producing huge quantities of waste water that need to be properly treated.
(6) Furthermore, the quantity of intercalation solution retained on the flakes after draining may range from 20 to 150 parts of solution by weight per 100 parts by weight of graphite flakes (pph) and more typically about 50 to 120 pph. During the high-temperature exfoliation, the residual intercalant species retained by the flakes decompose to produce various species of sulfuric and nitrous compounds (e.g., $NO_x$ and $SO_x$), which are undesirable. The effluents require expensive remediation procedures in order not to have an adverse environmental impact.

Hence, an urgent need exists for a graphene production process that requires a reduced amount of undesirable chemical (or elimination of these chemicals all together), shortened process time, less energy consumption, lower degree of graphene oxidation, reduced or eliminated effluents of undesirable chemical species into the drainage (e.g., sulfuric acid) or into the air (e.g., $SO_2$ and $NO_2$).

Our research has yielded a process for substantially chemical-free production of polymer matrix composites that exhibit an exceptionally low graphene proportion needed to reach a percolation threshold of graphene sheets to form a network of electron-conducting pathways in a polymer matrix. In addition, the process is of enhanced utility in that it is cost-effective, and provides graphene-polymer composite materials with significantly reduced environmental impact.

SUMMARY OF THE INVENTION

The invention provides a polymer matrix composite containing graphene sheets homogeneously dispersed in a polymer matrix wherein the polymer matrix composite exhibits a percolation threshold from 0.0001% to 0.1% by volume of graphene sheets to form a 3D network of interconnected graphene sheets or network of electron-conducting pathways. Such low percolation threshold values are unprecedented.

In certain embodiments, the polymer matrix exhibits an impact strength $E_p$ and the polymer matrix composite exhibits an impact strength $E_c$, as measured by ISO 179-1 or ASTM D6110-18: standard test method for determining the Charpy impact resistance of notched specimens of plastics, and wherein $E_c/E_p$ is from 1.2 to 20, more typically from 1.5 to 10. In other words, with such a low loading of graphene in a polymer, the improvement in impact strength of the polymer can be from 20% to approximately 20-fold.

In certain embodiments, the polymer matrix composite exhibits an electrical conductivity from $10^{-8}$ S/m to 2000 S/m (more typically from $10^{-6}$ S/m to 200 S/m) when measured under the condition that the polymer matrix contains no other additive or reinforcement material than graphene sheets. In some embodiments, the polymer matrix composite, when made to contain 0.1% by volume of graphene sheets, has a room temperature electrical conductivity no less than $10^{-6}$ S/m.

The polymer matrix preferably contains a thermoplastic resin selected from polyethylene, polypropylene, polybutylene, polyvinyl chloride, poly(vinylidiene fluoride), poly(tetrafluoroethylene), polyamide (Nylon-6, Nylon-12, Nylon-6,6, etc.), polyimide, polyetherimide, polyethylene terephthalate (PET), polybutylene terephthalate (PBT), polyphenylene sulfide, polyphenylene oxide, polysulfone, polyether sulfone, polybenzimidazole, polyvinyl acetate, polyvinyl alcohol, polycarbonate, polystyrene, poly(acrylonitrile-butadiene-styrene), poly (lactic acid), polyacrylate, poly(acrylate amide), poly(methyl methacrylate), polyoxymethylene, polyvinyl pyrrolidone (PVP), polyacrylic acid (PAA), a copolymer thereof, or a combination thereof.

The invention also provides a polymer matrix composite containing graphene sheets homogeneously dispersed in a polymer matrix wherein the polymer matrix composite exhibits a percolation threshold from 0.0001% to 2.0% by volume of graphene sheets to form a 3D network of interconnected graphene sheets or network of electron-conducting pathways and wherein the graphene sheets are selected from pristine graphene, graphene fluoride, graphene chloride, graphene bromide, graphene iodide, nitrogenated graphene, hydrogenated graphene, doped graphene, chemically functionalized graphene, or a combination thereof (not including CVD graphene, graphene oxide (GO), and reduced graphene oxide (RGO)) and the polymer matrix contains a thermoplastic resin selected from polyethylene, polypropylene, polybutylene, poly(tetrafluoroethylene), polyamide, polyimide, polyetherimide, polyethylene terephthalate, polybutylene terephthalate, polyphenylene sulfide, polyphenylene oxide, polysulfone, polyether sulfone, polybenzimidazole, polyvinyl acetate, polyvinyl alcohol, polycarbonate, polystyrene, poly(acrylonitrile-butadiene-styrene), poly (lactic acid), polyacrylate, poly(acrylate amide), poly(methyl methacrylate), polyoxymethylene, polyvinyl pyrrolidone (PVP), polyacrylic acid (PAA), a copolymer thereof, or a combination thereof. The graphene sheets do not contain graphene oxide (GO), reduced graphene oxide (chemically reduced graphene oxide, CRGO, or thermally reduced graphene oxide, TRGO), and GO produced by any method (e.g. thermally exfoliation or ultrasonication of GO).

The polymer matrix may further comprise an additive, filler, or reinforcement material dispersed therein.

In the invented polymer matrix composite, the graphene sheets may be selected from pristine graphene (not including CVD graphene), graphene fluoride, graphene chloride, graphene bromide, graphene iodide, nitrogenated graphene, hydrogenated graphene, doped graphene, chemically functionalized graphene, or a combination thereof. Preferably, no graphene oxide or any form of reduced graphene oxide (CRGO or TRGO) produced by using conventional chemical methods is included. Conventional chemical methods inevitably produce excessively high defect populations that cannot be fully recovered even after chemical or thermal reduction treatments.

In certain embodiments, in the polymer matrix composite, the chemically functionalized graphene contains a chemical functional group that is bonded to the polymer matrix. Such a functional group imparts desirable interfacial adhesion between the graphene sheets and the polymer matrix.

The chemically functionalized graphene may contain a chemical functional group selected from alkyl or aryl silane, alkyl or aralkyl group, hydroxyl group, carboxyl group, amine group, sulfonate group (—$SO_3H$), aldehydic group, quinoidal, fluorocarbon, or a combination thereof. Preferably, the chemical functional group is bonded to the polymer matrix for improved interfacial adhesion between a graphene sheet and the polymer matrix.

In certain embodiments, the chemically functionalized graphene contains a chemical functional group derived from an azide compound selected from the group consisting of 2-Azidoethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups,

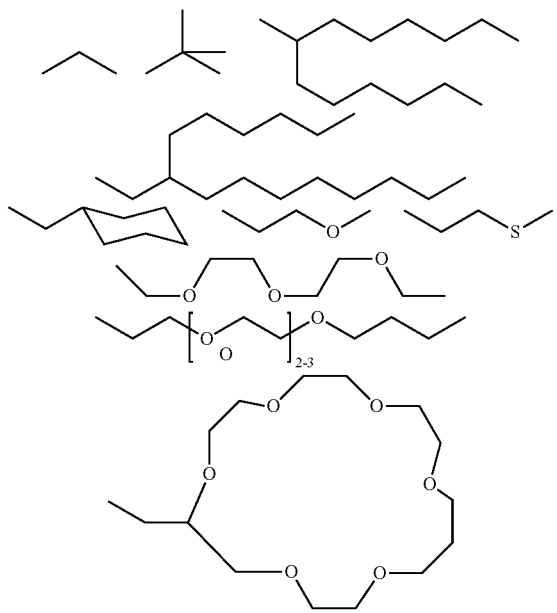

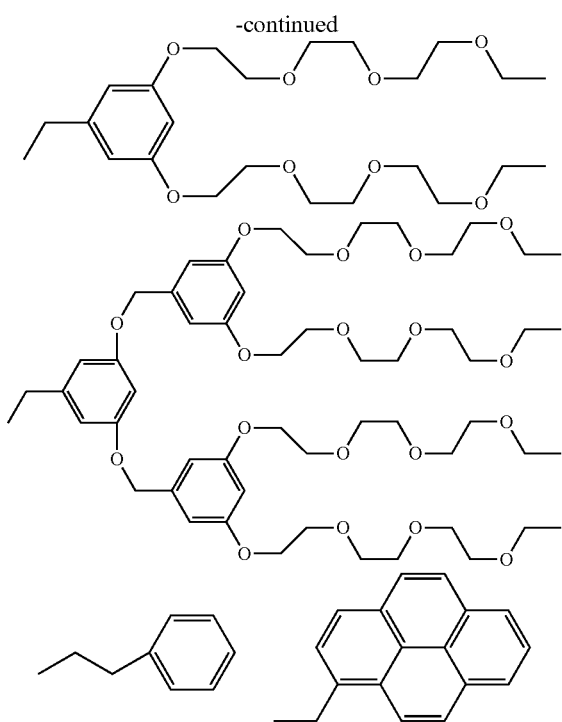

and combinations thereof. Preferably, the chemical functional group is bonded to the polymer matrix for improved interfacial adhesion between a graphene sheet and the polymer matrix.

In certain embodiments, the chemically functionalized graphene contains an oxygenated group selected from the group consisting of hydroxyl, peroxide, ether, keto, and aldehyde. These functional groups are capable of forming good bonding with a broad array of polymers.

In certain embodiments, the chemically functionalized graphene contains a chemical functional group selected from the group consisting of $SO_3H$, COOH, $NH_2$, OH, R'CHOH, CHO, CN, COCl, halide, COSH, SH, COOR', SR', $SiR'_3$, $Si(-OR'-)_yR'_{3-y}$, $Si(-O-SiR'_2-)OR'$, R", Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, and combinations thereof.

In certain embodiments, the chemically functionalized graphene contains a chemical functional group selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

In some embodiments, the chemically functionalized graphene contains a chemical functional group selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R'SH, R'CHO, R'CN, R'X, $R'N^+(R')_3X^-$, $R'SiR'_3$, $R'Si(-OR'-)_yR'_{3-y}$, $R'Si(-O-SiR'_2-)OR'$, R'—R", R'—N—CO, $(C_2H_4O-)_wH$, $(-C_3H_6O-)_wH$, $(-C_2H_4O)_w-R'$, $(C_3H_6O)_w-R'$, R', and w is an integer greater than one and less than 200. Preferably, the chemical functional group is bonded to the polymer matrix for improved interfacial adhesion between a graphene sheet and the polymer matrix.

The present invention provides a strikingly simple, fast, scalable, environmentally benign, and cost-effective method of producing the aforementioned polymer matrix composite. The method comprises: (a) mixing multiple particles of a graphitic material and multiple particles of a solid polymer material to form a mixture in an impacting chamber of an energy impacting apparatus, with or without using externally added impacting balls (milling balls) contained in the impacting chamber; (b) operating the energy impacting apparatus with a frequency and an intensity for a length of time sufficient for peeling off graphene sheets from the graphitic material and, indirectly or directly, transferring the graphene sheets to surfaces of the solid polymer material particles to produce graphene-coated solid polymer particles inside the impacting chamber; and (c) recovering the graphene-coated solid polymer particles from the impacting chamber and heating and consolidating the produced graphene-coated solid polymer particles to produce the polymer matrix composite.

This method is capable of producing single-layer or few layer graphene sheets coated on polymer particle surfaces, typically fully embracing the polymer particles, directly from a graphitic or carbonaceous material (a graphene source material). The method comprises subjecting a mixture of graphitic material, an optional oxidizing and/or functionalizing agent, particles of a solid polymer, and, optionally, impacting balls to mechanical agitation via a ball mill or similar energy impacting device for a length of time sufficient for peeling off graphene layers (planes of hexagonally arranged carbon atoms) from the source graphite material, and coating these peeled-off graphene layers onto surfaces of the solid polymer particles.

With the presence of impacting balls, graphene sheets can be peeled off from the source graphite particles and tentatively deposited onto the surfaces of impacting balls. When these graphene sheet-coated impacting balls subsequently impinge upon solid polymer particles, the graphene sheets are transferred to surfaces of polymer particles. These steps are followed by recovering graphene-coated polymer particles from the impact chamber, heating and consolidating these graphene-coated particles into a graphene-polymer composite.

If an oxidizing agent is present in the impacting chamber, the graphene sheets produced contain oxidized graphene or graphene oxide sheets. If a chemical functionalizing agent is present in the impacting chamber, the graphene sheets produced contain functionalized graphene or functionalized graphene oxide sheets. Preferred chemical functionalizing agents are discussed above.

In some embodiments, a plurality of impacting balls or media (milling balls) are added to the impacting chamber of the energy impacting apparatus. Graphene sheets are peeled off and transferred to surfaces of the impacting balls first. Subsequently, these graphene-coated impacting balls hit polymer particles and transfer graphene sheets thereto. Such a process is herein referred to as an indirect transfer process. In other embodiments, without the use of externally added impacting balls, the solid polymer particles can impact graphite particles and peel off graphene sheets therefrom and, concurrently, directly transferring graphene sheets to surfaces of solid polymer particles. This is herein referred to as the direct transfer process.

In some embodiments, step (a) comprises adding an oxidizing liquid in the mixture so that the oxidizing liquid acts to at least partially oxidize the graphene sheets during step (b). The oxidizing liquid may be selected from a liquid containing an oxidizer selected from $H_2O_2$, nitric acid, potassium permanganate, sodium permanganate, transition metal permanganate, sodium chlorate, potassium chlorate, or a combination thereof.

In some embodiments, the starting material (graphitic or carbonaceous material as a graphene source material) has never been previously intercalated or chemically oxidized. This starting material is not a graphite intercalation compound (GIC) or graphite oxide (GO). Preferably, the source graphitic material may be selected from natural graphite, synthetic graphite, highly oriented pyrolytic graphite, mesocarbon-microbead, graphite fiber, graphitic nanofiber, graphite oxide, graphite fluoride, chemically modified graphite, exfoliated graphite, vein graphite, or a combination thereof.

In certain embodiments, the starting material has been previously fluorinated, chlorinated, brominated, iodized, nitrogenated, or hydrogenated and the graphene-polymer composite contains graphene fluoride, graphene chloride, graphene bromide, graphene iodide, nitrogenated graphene, or hydrogenated graphene.

In some embodiments, the impacting chamber of the energy impacting apparatus further contains a protective fluid; e.g. inert gas, non-reactive liquid, water, etc.).

The invented method is essentially a two-step process, significantly reducing process costs. In less than 1-4 hours of process time, graphene sheets are peeled off from graphite particles and deposited onto surfaces of solid polymer particles, followed by a composite molding procedure for producing graphene-polymer composite. This process is stunningly short and simple.

A preferred embodiment of the present invention is a method of directly mixing a graphitic material and particles of a solid polymer material into an energy impacting device, such as a ball mill, and submitting the mixture to a ball milling or impacting treatment for a sufficiently long treatment time to peel off graphene layers from the source graphitic material and transfer these graphene layers immediately to the polymer particle surfaces to produce graphene-coated solid polymer particles. These graphene layers are typically single-layer or few-layer graphene sheets (typically <10 layers). Thus, in some embodiments, graphene-coated solid polymer particles contain from 1 to 10 layers of graphene or 1 to 10 graphene planes embracing one of said polymer particles.

Following this step, the graphene-coated polymer particles were subjected to a molding procedure that entails melting the polymer particles and consolidating the graphene-containing polymer melt into a desired solid shape. Such a molding procedure may include extrusion, compression molding, injection molding, casting, sheeting, blow-molding, etc.

This is a surprisingly simple method. In contrast, prior researchers and manufacturers have focused on more complex, time-consuming, chemical-intensive and costly methods to create graphene (including graphene oxide) and their composites in industrial quantities. The present invention has several unexpected attributes or advantages:

(1) Unlike the chemical intercalation and oxidation (which requires expansion of inter-graphene spaces, further expansion or exfoliation of graphene planes, and full separation of exfoliated graphene sheets), the instant method directly removes graphene sheets from a source graphitic material and transfers these graphene sheets to surfaces of solid polymer particles. No undesirable chemicals (e.g. sulfuric acid and nitric acid) are used in the production of graphene sheet-coated polymer particles and subsequently molded polymer composites.

(2) Unlike conventional oxidation and intercalation methods (e.g. well-known Hummer's method) that always produce heavily oxidized graphene sheets (i.e. heavily damaged graphene oxide, having an oxygen content up to 47% by weight) in a non-controllable manner, initially pristine graphene sheets are produced by using the invented approach. These pristine graphene sheets can be concurrently and subsequently oxidized in a controlled manner to yield GO sheets of controllable and desirable oxygen contents from 5% to approximately 50% by weight. The GO sheets produced by conventional methods typically cannot recover their structure and properties even after thermal or chemical reduction of GO sheets. In contrast, the sheets being initially free of oxidation damage allow the creation of graphene containing products with higher electrical and thermal conductivity.

(3) The amount of sulfuric acid/oxidizer used for producing the newer versions of graphene oxide is typically only 1-10% of what would be required for GO production using conventional methods. Furthermore, more environmentally benign oxidizers (e.g. $H_2O_2$) can be readily and easily used, instead of undesirable chemicals such as strong sulfuric acids and nitric acid or potassium permanganate.

(4) Consequently, the required amounts of washing water, after production of pristine graphene or graphene oxide, are dramatically reduced. Furthermore, the amounts of $NO_x$ and $SO_x$ resulting from residual sulfuric acid and nitric acid of conventional methods are dramatically reduced or even totally eliminated.

The energy impacting apparatus may be selected from a ball mill, vibratory ball mill, planetary ball mill, high energy mill, basket mill, agitator ball mill, continuous ball mill, stirred ball mill, tumbler ball mill, rotating chamber mill, pressurized ball mill, vacuum ball mill, freezer (SPEX) mill, vibratory sieve, ultrasonic homogenizer mill, resonant acoustic mixer, or shaker table.

The presently invented process is capable of producing composites containing single-layer graphene sheets. The graphene produced can contain pristine graphene, oxidized graphene with less than 5% oxygen content by weight, graphene fluoride with less than 5% fluorine by weight, graphene with a carbon content no less than 95% by weight, or functionalized graphene.

Another surprising and highly advantageous feature of the presently invented method is the notion that graphene sheet production and oxidation can be accomplished concurrently in the same impacting chamber provided an oxidizing agent is enclosed in the impacting chamber. The impact-induced kinetic energy experienced by the carrier particles are of sufficient energy and intensity to chemically activate the edges and surfaces of graphene sheets coated on carrier particle surfaces; e.g. creating highly active sites or free radicals). Desired oxygen-containing groups (e.g. —COOH, —OH, etc.) can be imparted to graphene edges and/or surfaces, provided that selected chemical species (oxidizing agents) containing desired chemical function groups.) are dispersed in the impacting chamber. Chemical oxidation reactions can occur in situ as soon as the reactive sites or active radicals are formed.

The present invented method may further contain a procedure of functionalizing the produced graphene oxide sheets. Such a chemical functionalization procedure may be conducted concurrently with production of graphene sheets if a desired chemical functionalizing agent is included in the mixture of the impacting chamber during step (a) or step (b). Alternatively, chemical functionalization may be conducted after the graphene or graphene oxide sheets are produced.

In some embodiments, functionalizing agents contain a chemical functional group selected from alkyl or aryl silane, alkyl or aralkyl group, hydroxyl group, carboxyl group, amine group, sulfonate group (—$SO_3H$), aldehydic group, quinoidal, fluorocarbon, or a combination thereof.

Alternatively, the functionalizing agent contains an azide compound selected from the group consisting of 2-Azido-ethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups,

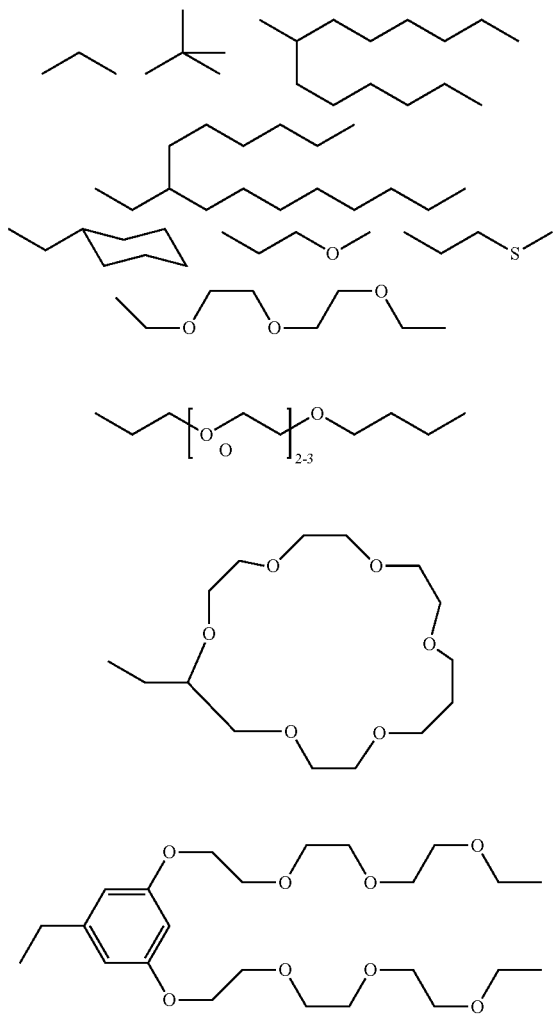

and combinations thereof.

In certain embodiments, the functionalizing agent contains an oxygenated group selected from the group consisting of hydroxyl, peroxide, ether, keto, and aldehyde. In certain embodiments, the functionalizing agent contains a functional group selected from the group consisting of $SO_3H$, COOH, $NH_2$, OH, R'CHOH, CHO, CN, COCl, halide, COSH, SH, COOK', SR', $SiR'_3$, $Si(—OR'—)_yR'_{3-y}$, $Si(—O—SiR'_2—)OR'$, R", Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, and combinations thereof.

The functionalizing agent may contain a functional group is selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

In some embodiments, the functionalizing agent contains a functional group selected from OY, NHY, O═C—OY, P═C—NR'Y, O═C—SY, O═C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R'SH, R'CHO, R'CN, R'X, $R'N^+(R')_3X^-$, $R'SiR'_3$, $R'Si(—OR'—)_yR'_{3-y}$, R'Si(—O—$SiR'_2$—)OR', R'—R", R'—N—CO, $(C_2H_4O—)_wH$, $(—C_3H_6O—)_wH$, $(—C_2H_4O)_w—R'$, $(C_3H_6O)_w—R'$, R', and w is an integer greater than one and less than 200.

DETAILED DESCRIPTION OF PREFERRED EMBODIMENTS

Figure 1:
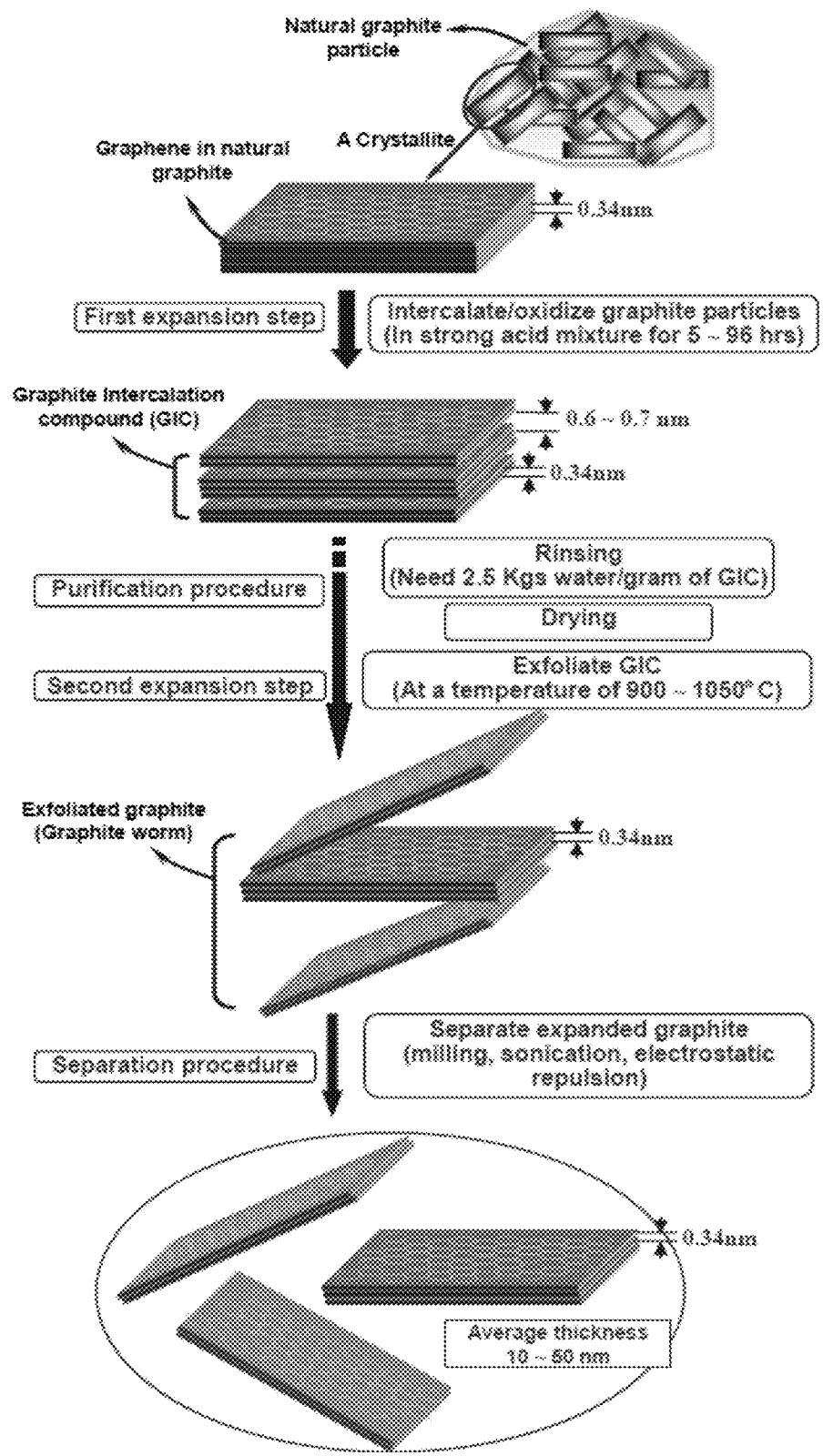
FIG. 1 A flow chart showing the most commonly used prior art process of producing highly oxidized NGPs that entails tedious chemical oxidation/intercalation, rinsing, and high-temperature exfoliation procedures.

The invention provides a polymer matrix composite containing graphene sheets homogeneously dispersed in a polymer matrix wherein the polymer matrix composite exhibits a percolation threshold (T) from 0.0001% to 0.1% by volume of graphene sheets to form a 3D network of interconnected graphene sheets or network of electron-conducting pathways. Such low percolation threshold values are unprecedented. As indicated in Table 1, the typical percolation values in graphene-reinforced polymer matrix composites are from 0.1% by volume to 7.5% by weight (approximately 4.5% by volume since physical density of PA6 or Nylon-6=1.15 g/cm$^3$ and that of RGO=1.9 g/cm$^3$). The present invention also provides a unique and innovative method of producing graphene-polymer composites having an exceptionally low graphene loading that exceeds the percolation threshold. The same type of graphene-polymer composite, if produced using prior art methods, exhibits a percolation threshold value typically 2 to 20 times higher.

By adding graphene sheets in a polymer matrix by using the presently invented method one can also significantly improve the impact strength of the polymer matrix. This is also unexpected. For instance, if the polymer matrix exhibits an impact strength $E_p$ and the polymer matrix composite exhibits an impact strength $E_c$, as measured by ISO 179-1 or ASTM D6110-10 (standard test method for determining the Charpy impact resistance of notched specimens of plastics), then we typically find that the ratio $E_c/E_p$ is from 1.2 to 20, more typically from 1.5 to 10. The improvement in impact strength of the polymer can be from 20% to approximately 20-fold.

In certain embodiments, the polymer matrix composite exhibits an electrical conductivity from $10^{-8}$ S/m to 2000 S/m (more typically from $10^{-6}$ S/m to 200 S/m) when measured under the condition that the polymer matrix contains no other additive or reinforcement material than graphene sheets. The polymer matrix composite, when made to contain 0.1% by volume of graphene sheets, typically has a room temperature electrical conductivity no less than $10^{-6}$ S/m, more typically no less than $10^{-4}$ S/m, further more typically no less than $10^{-3}$ S/m, and often no less than $10^{-2}$ S/m.

TABLE 1

The threshold graphene volume fraction for percolation of graphene sheets in a polymer matrix (data adapted from Table 2 of J. H. Du, et al. "The Fabrication, Properties, and Uses of Graphene/Polymer Composites," *Macromol. Chem. Phys.* 2012, 213. 1060-1077)

| Filler type | Matrix | Percolation threshold, $\phi_c$ | Highest $\sigma$ [S m$^{-1}$] |
|---|---|---|---|
| Graphene from XG Science | PA12 | 2 wt % | |
| TRGO | PA6 | 7.5 wt % | 0.71 × 10$^{-2}$ (12 wt %) |
| In situ CRGO | PS | 0.19 vol % | 72.18 (2.45 vol %) |
| in situ CBGO | PS | 0.1 vol % | 1 (2.5 vol %) |
| PS-graphene | PS | 2.7 wt % | 10$^{-4}$ (5 wt %) |
| TRGO | PS | 0.33 vol % | 3.49 (1.1 vol %) |
| GO | PP | | 0.3 (4.9 wt %) |
| TRGO | iPP | <5 wt % | 0.02 (10 wt %) |
| TRGO | PU | 2 wt % | 0.0275 (6 wt %) |
| TRGO | PU | 2 wt % | 0.0492 (7 wt %) |
| TRGO | PVDF | 2 wt % | |
| Acid functionalized-graphene | PVDF foam | 0.5 wt % | 10.16 (2 wt %) |
| TRGO | HDPE | 1 vol % | 0.01 (3.8 vol %) |
| TRGO | Poly(styrene-co-acrylonitrile) | 4 wt % | 0.12 (12 wt %) |
| | PC | 2.5 wt % | 0.1 (12 wt %) |
| TRGO | PC | 1.25 wt % | |
| Microwave-exfoliated GO | PC | 1.3 wt % | 2.5 × 10$^{-3}$ (3 wt %) |
| TRGO | PET | 0.47 vol % | 2.11 (3 vol %) |
| In situ CRGO | Vinyl chloride/vinyl acetate copolymer | 0.15 vol % | 1 (3.5 vol %) |
| CRGO | Epoxy | 0.52 vol % | −10 (8.8 vol %) |
| CVDG | PDMS | | 1000 (0.5 wt %) |
| TRGO | PMMA foam | 0.6 vol % | 3.11 (1.8 vol %) |
| TRGO | PLA | 3 = 5 wt % | |
| Graphene by directly sonicating and exfoliating graphite | PVC | 0.6 vol % | 5.8 (6.47 vol %) |

The polymer matrix preferably contains a thermoplastic resin selected from polyethylene, polypropylene, polybutylene, polyvinyl chloride, poly(vinylidene fluoride), poly(tetrafluoroethylene), polyamide (Nylon-6, Nylon-12, Nylon-6,6, etc.), polyimide, polyetherimide, polyethylene terephthalate (PET), polybutylene terephthalate (PBT), polyphenylene sulfide, polyphenylene oxide, polysulfone, polyether sulfone, polybenzimidazole, polyvinyl acetate, polyvinyl alcohol, polycarbonate, polystyrene, poly(acrylonitrile-butadiene-styrene), poly (lactic acid), polyacrylate, poly(acrylate amide), poly(methyl methacrylate), polyoxymethylene, polyvinyl pyrrolidone (PVP), polyacrylic acid (PAA), a copolymer thereof, or a combination thereof.

The invention also provides a polymer matrix composite containing graphene sheets homogeneously dispersed in a polymer matrix wherein the polymer matrix composite exhibits a percolation threshold from 0.0001% to 2.0% by volume of graphene sheets to form a 3D network of interconnected graphene sheets or network of electron-conducting pathways and wherein the graphene sheets are selected from pristine graphene, graphene fluoride, graphene chloride, graphene bromide, graphene iodide, nitrogenated graphene, hydrogenated graphene, doped graphene, chemically functionalized graphene, or a combination thereof (not including CVD graphene, graphene oxide (GO), and reduced graphene oxide (RGO)) and the polymer matrix contains a thermoplastic resin selected from polyethylene, polypropylene, polybutylene, poly(tetrafluoroethylene), polyamide, polyimide, polyetherimide, polyethylene terephthalate, polybutylene terephthalate, polyphenylene sulfide, polyphenylene oxide, polysulfone, polyether sulfone, polybenzimidazole, polyvinyl acetate, polyvinyl alcohol, polycarbonate, polystyrene, poly(acrylonitrile-butadiene-styrene), poly (lactic acid), polyacrylate, poly(acrylate amide), poly(methyl methacrylate), polyoxymethylene, a copolymer thereof, or a combination thereof. The graphene sheets do not contain graphene oxide (GO), reduced graphene oxide (chemically reduced graphene oxide, CRGO, or thermally reduced graphene oxide, TRGO), and GO produced by any method (e.g. thermally exfoliation or ultrasonication of GO).

The polymer matrix may further comprise an additive (e.g. UV stabilizer), filler (e.g. metal, glass, ceramic, or carbon particles, etc.) or reinforcement material (glass fiber, polymer fiber, carbon fiber, carbon nanotube, carbon nanofiber, ceramic fiber, etc.) dispersed in the polymer matrix. The proportion of the additive, filler, and reinforcement may be varied from 0.01% by weight to 60% by weight.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nanofiber.

One preferred specific embodiment of the present invention is a method of producing non-oxidized or oxidized versions of graphene sheets or nanographene platelet (NGP) material. The NGP is essentially composed of a sheet of graphene plane (hexagonal lattice of carbon atoms) or multiple sheets of graphene plane stacked and bonded together (typically, on an average, less than five sheets per multi-layer platelet). Each graphene plane, also referred to as a graphene sheet or basal plane comprises a two-dimensional hexagonal structure of carbon atoms. Each platelet has a length and a width parallel to the graphite plane and a thickness orthogonal to the graphite plane. By definition, the thickness of an NGP is 100 nanometers (nm) or smaller, with a single-sheet NGP (single-layer graphene) being as thin as 0.34 nm. However, the NGPs produced with the instant methods are mostly single-layer graphene with some few-layer graphene sheets (2-10 layers, but mostly <5 layers). The length and width of a NGP are typically between 200 nm and 20 μm, but could be longer or shorter, depending upon the sizes of source graphite material particles.

Figure 2:
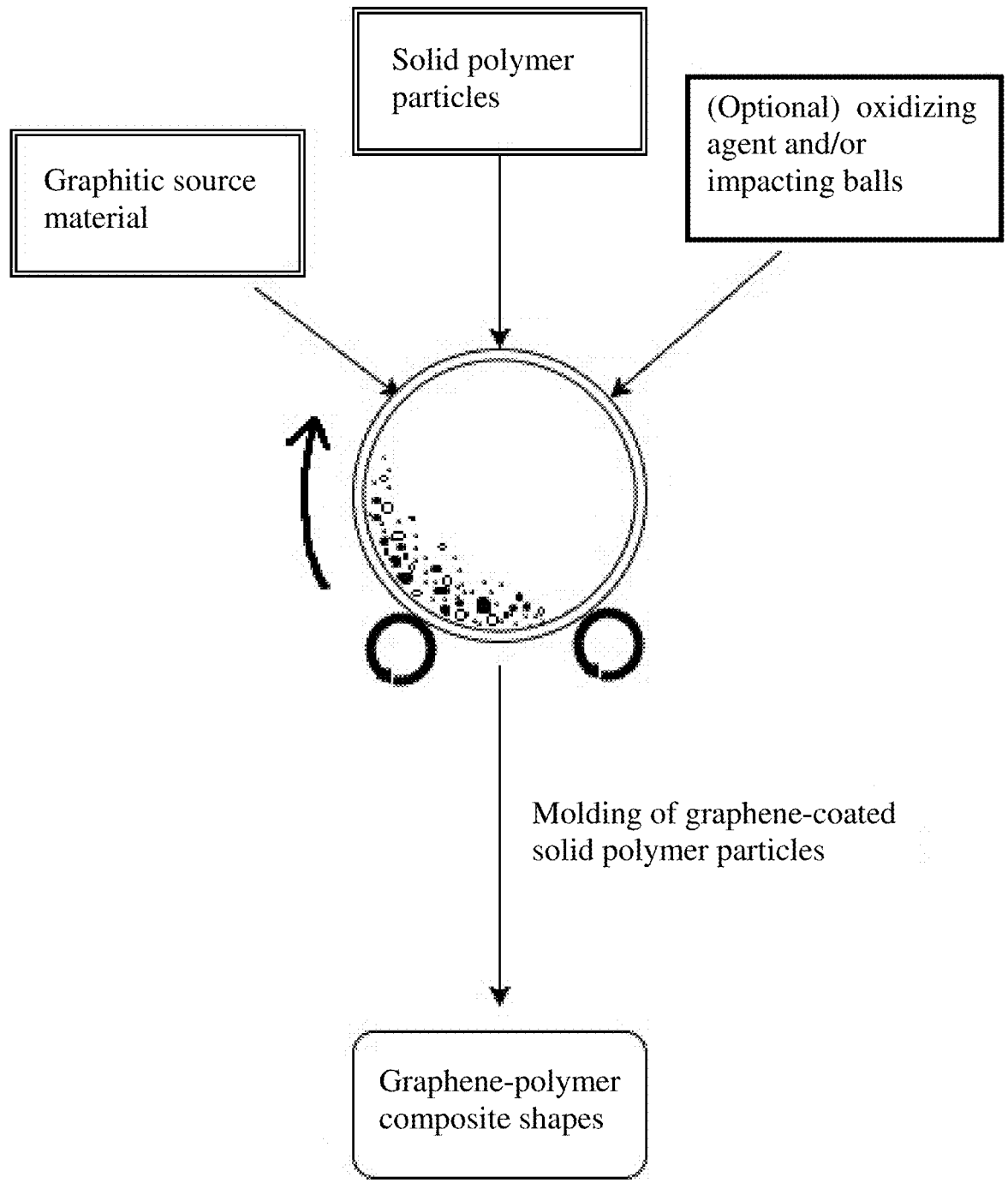
FIG. 2 A flow chart showing the presently invented two-step process for producing graphene-polymer composites.

The present invention provides a strikingly simple, fast, scalable, environmentally benign, and cost-effective process to produce graphene and graphene-polymer composite. The process avoids essentially all of the drawbacks associated with prior art processes. As schematically illustrated in FIG. 2, one preferred embodiment of this method entails placing source graphitic material particles, an optional oxidizing agent and/or chemical functionalization agent, and solid polymer particles (no impacting balls other than the solid polymer particles themselves) in an impacting chamber. After loading, the resulting mixture is immediately exposed to impacting energy, which is accomplished by rotating the chamber to enable the impacting of the solid polymer particles (no externally added impacting balls being present inside the chamber) against graphite particles. These repeated impacting events (occurring in high frequencies and high intensity) act to peel off graphene sheets from the surfaces of graphitic material particles and directly transfer these graphene sheets to the surfaces of solid polymer particles. This is a "direct transfer" process.

If an oxidizing agent and/or chemical functionalization agent is present in the impacting chamber, oxidation and/or chemical functionalization of the produced graphene sheets also occurs substantially concurrently.

In certain embodiments, the impacting chambers contain impacting balls (e.g. milling balls such as stainless steel beads or zirconia beads), graphene sheets are peeled off by the impacting balls and tentatively transferred to the surfaces of impacting balls first. When the graphene-coated impacting balls subsequently impinge upon the solid polymer particles, the graphene sheets are transferred to surfaces of the solid polymer particles. This is an "indirect transfer" process. Again, if an oxidizing agent and/or chemical functionalization agent is present in the impacting chamber, oxidation and/or chemical functionalization of the produced graphene sheets also occurs substantially concurrently.

In less than 1-4 hours, most of the constituent graphene sheets of source graphite particles are peeled off, forming sheets of mostly single-layer graphene and few-layer graphene (mostly less than 5 layers) that are coated on solid polymer particles and often fully embracing the polymer particles. Following the direct or indirect transfer process (coating of graphene sheets on solid polymer particles), the resulting graphene sheet-coated solid polymer particles may be separated or isolated from the externally added impacting balls, if present. The graphene-coated solid polymer particles may be made into a desired composite shape using a molding procedure, such as extrusion, compression-molding, injection-molding, casting, and blow-molding.

In contrast, as shown in FIG. 1, the prior art chemical processes typically involve immersing graphite powder in a mixture of concentrated sulfuric acid, nitric acid, and an oxidizer, such as potassium permanganate or sodium per-chlorate, forming a reacting mass that requires typically 5-120 hours to complete the chemical intercalation/oxidation reaction. Once the reaction is completed, the slurry is subjected to repeated steps of rinsing and washing with water and then subjected to drying treatments to remove water. The dried powder, referred to as graphite intercalation compound (GIC) or graphite oxide (GO), is then subjected to a thermal shock treatment. This can be accomplished by placing GIC in a furnace pre-set at a temperature of typically 800-1100° C. (more typically 950-1050° C.). The resulting products are typically highly oxidized graphene (i.e. graphene oxide with a high oxygen content), which must be chemically or thermal reduced to obtain reduced graphene oxide (RGO). RGO is found to contain a high defect population and, hence, is not as conducting as pristine graphene. We have observed that that the pristine graphene paper (prepared by vacuum-assisted filtration of pristine graphene sheets) exhibit electrical conductivity values in the range from 1,500-4,500 S/cm. In contrast, the RGO paper prepared by the same paper-making procedure typically exhibits electrical conductivity values in the range from 100-1,000 S/cm.

It is again critically important to recognize that the impacting process not only avoids significant chemical usage, but also produces a higher quality final product— pristine graphene as opposed to thermally reduced graphene oxide, as produced by the prior art process. Pristine graphene enables the creation of GO materials in a controlled manner.

Although the mechanisms remain incompletely understood, this revolutionary process of the present invention appears to essentially eliminate the required functions of graphene plane expansion, intercalant penetration, exfoliation, and separation of graphene sheets and replace it with an entirely mechanical exfoliation process. The whole process can take less than 1-4 hours, and can be done with no added undesirable chemicals. This is absolutely stunning, a shocking surprise to even those top scientists and engineers or those of extraordinary ability in the art.

Another surprising result of the present study is the observation that a wide variety of carbonaceous and graphitic materials can be directly processed without any particle size reduction or pre-treatment. This material may be selected from natural graphite, synthetic graphite, highly oriented pyrolytic graphite, mesocarbon microbead, graphite fiber, graphitic nanofiber, graphite oxide, graphite fluoride, chemically modified graphite, exfoliated graphite, or a combination thereof. By contrast, graphitic material for used for the prior art chemical formation and reduction of graphene oxide requires size reduction to 75 um or less average particle size. This process requires size reduction equipment (for example hammer mills or screening mills), energy input, and dust mitigation. By contrast, the energy impacting device method can accept almost any size of graphitic material. Starting material of mm or cm in size or larger has been successfully processed to create graphene. The only size limitation is the chamber capacity of the energy impacting device.

The presently invented process is capable of producing single-layer graphene or graphene oxide sheets coated on solid polymer particles, which can be from 100 nm to cm in diameter.

The presently invented process does not involve the production of GIC and, hence, does not require the exfoliation of GIC at a high exfoliation temperature (e.g. 800-1,100° C.). This is another major advantage from environmental protection perspective. The prior art processes require the preparation of dried GICs containing sulfuric acid and nitric acid intentionally implemented in the inter-graphene spaces and, hence, necessarily involve the decomposition of $H_2SO_4$ and $HNO_3$ to produce volatile gases (e.g. $NO_X$ and $SO_X$) that are highly regulated environmental hazards. The presently invented process completely obviates the need to decompose $H_2SO_4$ and $HNO_3$ and, hence, is environmentally benign. No undesirable gases are released into the atmosphere during the combined graphite expansion/exfoliation/separation process of the present invention.

One embodiment of the present invention is the inclusion of impacting balls or media to the impacting chamber, as illustrated in FIG. 2. The impact media may contain balls of metal, glass, ceramic, or organic materials. The size of the impacting media may be in the range from 1 mm to 20 mm, or it may be larger or smaller. The shape of the impacting media may be spherical, needle like, cylindrical, conical, pyramidal, rectilinear, or other shapes. A combination of shapes and sizes may be selected. The size distribution may be unimodal Gaussian, bimodal or tri-modal.

After direct transfer or indirect transfer of graphene sheets to solid polymer particle surfaces, the graphene-coated polymer particles may be molded into a polymer composite of any desired shape using known polymer processing methods.

One significant advantage of the present invention as compared to prior art is flexibility of selecting polymer materials. There are many opportunities to use pre-consumer or post-consumer waste material as the carrier, diverting this material from disposal by landfill or incineration.

Figure 3:
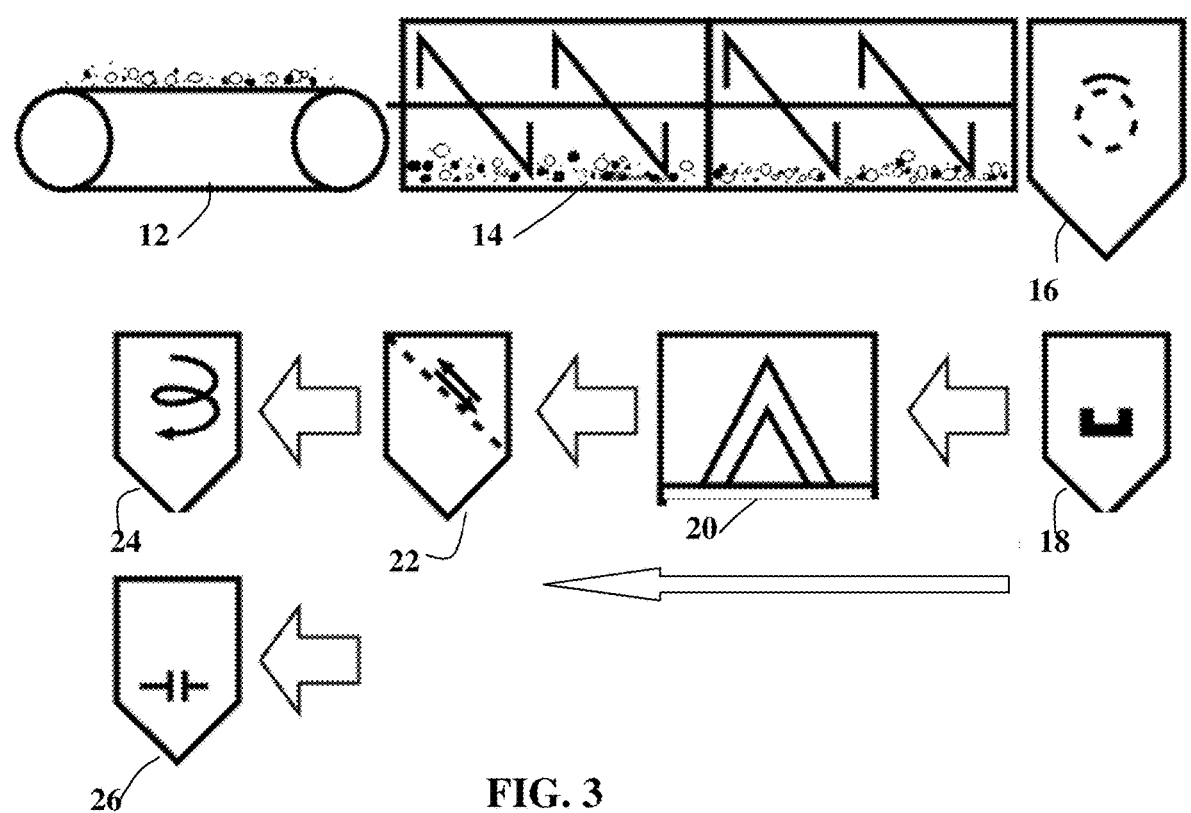
FIG. 3 A flow chart showing the presently invented process for producing graphene sheet-coated polymer particles via a continuous ball mill.

In a desired embodiment, the presently invented method is carried out in an automated and/or continuous manner. For instance, as illustrated in FIG. 3, the mixture of graphite particles and solid polymer particles (plus optional impacting balls) is delivered by a conveyer belt 12 and fed into a continuous ball mill 14. After ball milling to form graphene-coated solid polymer particles, the product mixture (possibly also containing some residual graphite particles and optional impacting balls) is discharged from the ball mill apparatus 14 into a screening device (e.g. a rotary drum 16) to separate graphene-coated solid polymer particles from residual graphite particles (if any) and impacting balls (if any). This separation operation may be assisted by a magnetic separator 18 if the impacting balls are ferromagnetic (e.g. balls of Fe, Co, Ni, or Mn-based metal). The graphene-coated polymer particles may be delivered into a molding cavity 20 for press-molding, for instance. The product mass can be further screened in another (optional) screening device 22, a powder classifier or cyclone 24, and/or an electrostatic separator 26. These procedures can be fully automated.

Figure 4A:
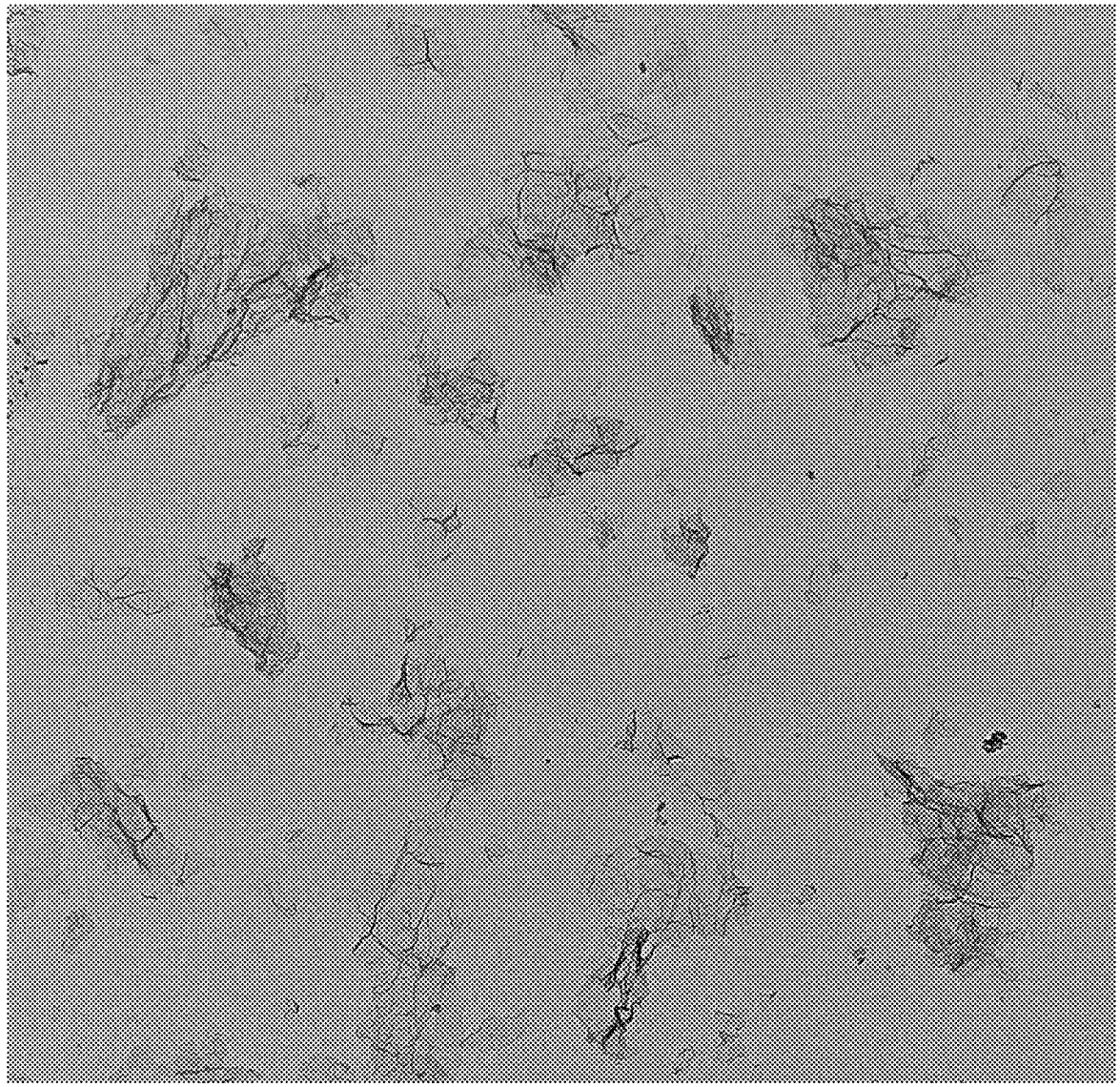
FIG. 4(A) Transmission electron micrograph of graphene sheets produced by conventional Hummer's route (much smaller graphene sheets, but comparable thickness).
Figure 4B:
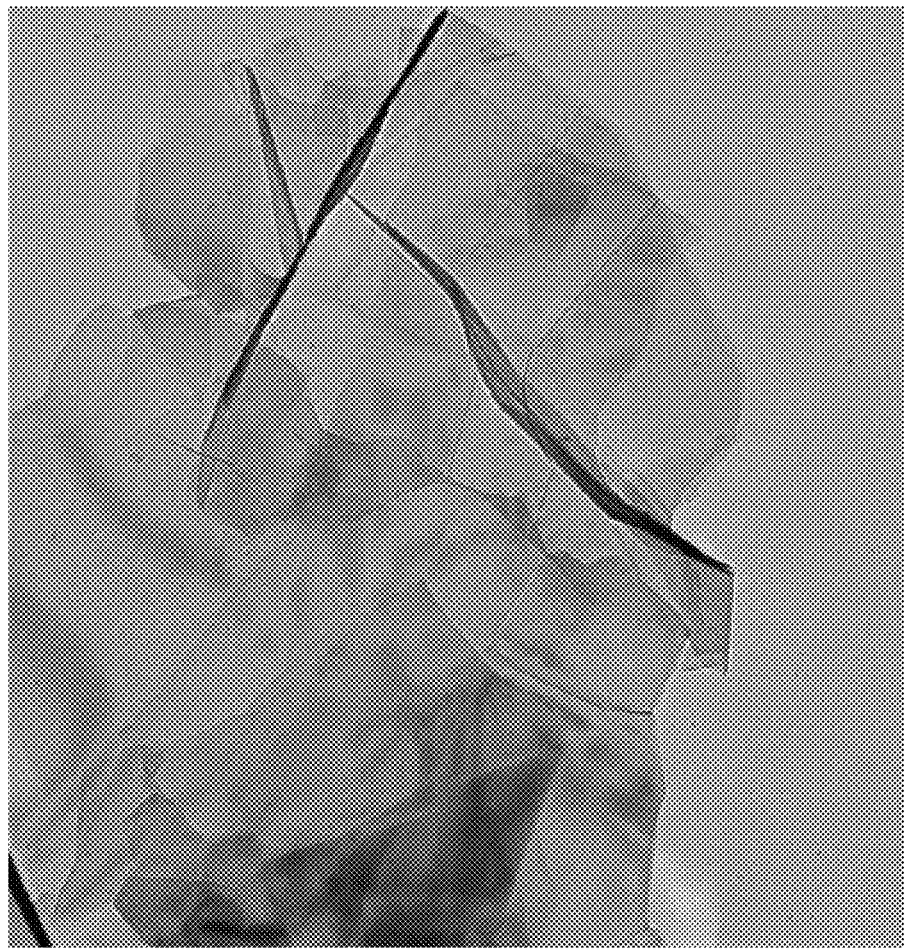
FIG. 4(B) Transmission electron micrograph of graphene sheets produced by the presently invented impact energy method.

As illustrative examples, FIG. 4(A) shows a transmission electron micrograph of graphene sheets produced by conventional Hummer's route (much smaller graphene sheets, but comparable thickness) and FIG. 4(B) shows a transmission electron micrograph of graphene sheets produced by the presently invented impact energy method, which are larger in length and width.

Graphene sheets transferred to solid polymer particle surfaces have a significant proportion of surfaces that correspond to the edge planes of graphite crystals. The carbon atoms at the edge planes are reactive and must contain some heteroatom or group to satisfy carbon valency. There are many types of functional groups (e.g. hydroxyl and carboxylic) that are naturally present at the edge or surface of graphene nanoplatelets produced through transfer to a solid polymer particle. The impact-induced kinetic energy experienced by the graphene-coated particles are of sufficient energy and intensity to chemically activate the edges and even surfaces of graphene sheets coated on polymer particle surfaces (e.g. creating highly active sites or free radicals). These conditions enable ready oxidation and/or chemical functionalization of the graphene sheets (free-standing or being supported on a solid polymer surface) in the presence of an oxidizing agent/functionalization agent in the impacting chamber.

If certain chemical species containing desired chemical function groups (e.g. —$NH_2$, Br—, etc.) are added in the impacting chamber (preferably after oxidation of graphene occurs), these functional groups can be imparted to graphene edges and/or surfaces. In other words, production and chemical functionalization of graphene oxide sheets can be accomplished concurrently by including appropriate chemical compounds in the impacting chamber. In summary, a major advantage of the present invention over other processes is the simplicity of simultaneous production and modification of surface chemistry.

In one preferred group of chemical agents, the resulting functionalized NGP may broadly have the following formula(e): [NGP]—$R_m$, wherein m is the number of different functional group types (typically between 1 and 5), R is selected from $SO_3H$, COOH, $NH_2$, OH, R'CHOH, CHO, CN, COCl, halide, COSH, SH, COOR', SR', $SiR'_3$, Si(—OR'—)$_y$R'$_{3-y}$, Si(—O—$SiR'_2$—)OR', R", Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate.

For NGPs to be effective reinforcement fillers in epoxy resin, the function group —$NH_2$ is of particular interest. For example, a commonly used curing agent for epoxy resin is diethylenetriamine (DETA), which has three —$NH_2$ groups. If DETA is included in the impacting chamber, one of the three —$NH_2$ groups may be bonded to the edge or surface of a graphene sheet and the remaining two un-reacted —$NH_2$ groups will be available for reacting with epoxy resin later. Such an arrangement provides a good interfacial bonding between the NGP (graphene sheets) and the matrix resin of a composite material.

Other useful chemical functional groups or reactive molecules may be selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), hexamethylenetetramine, polyethylene polyamine, polyamine epoxy adduct, phenolic hardener, non-brominated curing agent, non-amine curatives, and combinations thereof. These functional groups are multi-functional, with the capability of reacting with at least two chemical species from at least two ends. Most importantly, they are capable of bonding to the edge or surface of graphene using one of their ends and, during subsequent epoxy curing stage, are able to react with epoxide or epoxy resin at one or two other ends.

The above-described [NGP]—$R_m$ may be further functionalized. This can be conducted by opening up the lid of an impacting chamber after the —$R_m$ groups have been attached to graphene sheets and then adding the new functionalizing agents to the impacting chamber and resuming the impacting operation. The resulting graphene sheets or platelets include compositions of the formula: [NGP]-$A_m$, where A is selected from OY, NHY, O=C—OY, P=C—NR'Y, O=C—SY, O=C—Y, —CR'1-OY, N'Y or C'Y, and Y is an appropriate functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R'SH, R'CHO, R'CN, R'X, R'$N^+(R')_3X^-$, $R'SiR'_3$, R'Si(—OR'—)$_y$R'$_{3-y}$, R'Si(—O—$SiR'_2$—)OR', R'—R", R'—N—CO, ($C_2H_4$O—)$_w$H, (—$C_3H_6$O—)$_w$H, (—$C_2H_4$O)$_w$—R', ($C_3H_6$O)$_w$—R', R', and w is an integer greater than one and less than 200.

The NGPs may also be functionalized to produce compositions having the formula: [NGP]—[R'-A]$_m$, where m, R' and A are as defined above. The compositions of the invention also include NGPs upon which certain cyclic compounds are adsorbed. These include compositions of matter of the formula: [NGP]—[X—$R_a$]$_m$, where a is zero or a number less than 10, X is a polynuclear aromatic, polyheteronuclear aromatic or metallopolyheteronuclear aromatic moiety and R is as defined above. Preferred cyclic compounds are planar. More preferred cyclic compounds for adsorption are porphyrins and phthalocyanines. The adsorbed cyclic compounds may be functionalized. Such compositions include compounds of the formula, [NGP]—[X-$A_a$]$_m$, where m, a, X and A are as defined above.

The functionalized NGPs of the instant invention can be prepared by sulfonation, electrophilic addition to deoxygenated platelet surfaces, or metallation. The graphitic platelets can be processed prior to being contacted with a functionalizing agent. Such processing may include dispersing the platelets in a solvent. In some instances the platelets may then be filtered and dried prior to contact. One particularly useful type of functional group is the carboxylic acid moieties, which naturally exist on the surfaces of NGPs if they are prepared from the acid intercalation route discussed earlier. If carboxylic acid functionalization is needed, the NGPs may be subjected to chlorate, nitric acid, or ammonium persulfate oxidation.

Carboxylic acid functionalized graphitic platelets are particularly useful because they can serve as the starting point for preparing other types of functionalized NGPs. For example, alcohols or amides can be easily linked to the acid to give stable esters or amides. If the alcohol or amine is part of a di- or poly-functional molecule, then linkage through the O- or NH-leaves the other functionalities as pendant groups. These reactions can be carried out using any of the methods developed for esterifying or aminating carboxylic acids with alcohols or amines as known in the art. Examples of these methods can be found in G. W. Anderson, et al., J. Amer. Chem. Soc. 86, 1839 (1964), which is hereby incorporated by reference in its entirety. Amino groups can be introduced directly onto graphitic platelets by treating the platelets with nitric acid and sulfuric acid to obtain nitrated platelets, then chemically reducing the nitrated form with a reducing agent, such as sodium dithionite, to obtain amino-functionalized platelets.

The following examples serve to provide the best modes of practice for the present invention and should not be construed as limiting the scope of the invention:

Example 1: Polymer-Graphene Composites from Flake Graphite and Polypropylene (PP), Polyethylene (PE), and Polyamide (Nylon 6/6) Powder Powder samples of PE, PP, and Nylon from various sources were used as received or subjected to high-intensity ball milling to reduce particles to various sizes. Polymer-solvent liquid solutions were also subjected to atomization and spray-drying to obtain sub-micron and micron particles.

These polymer particles were then subjected to ball milling to obtain graphene-coated polymer particles. In some cases, $ZrO_2$ balls were used as the externally added impacting balls; hence, an indirect transfer process. In a typical procedure, 1 kg of polypropylene pellets and 50 grams of flake graphite (50 mesh, average particle size 0.18 mm provided by Asbury Carbons, Asbury N.J.) were placed in a ball mill-like rotational container or tumbler. The rotational container was operated at 30 rpm for 2 hours and 4 hours, respectively. The polymer particles were found to be coated with a dark carbon layer. Coated polymer particles were placed over a 50 mesh sieve and a small amount of unprocessed flake graphite was removed.

Graphene coated polymer powders were then compression-molded into rectangular bars for electrical conductivity measurements and impact testing. Summarized in Table 2 below are the measured critical graphene volume fraction values $\Phi_c$ for percolation in various graphene-polymer composites having various starting polymer particle sizes.

TABLE 2

Electrical conductivity percolation threshold of graphene in a polymer matrix.

| Polymer particle size (μm) | Percolation threshold, $\Phi_c$ (%); milling time 2 hrs | Percolation threshold, $\Phi_c$ (%); milling time 4 hrs |
|---|---|---|
| 0.2 | 0.55 | 1.95 |
| 1.1 | 0.1 | 0.28 |
| 10.5 | 0.0095 | 0.031 |
| 98 | 0.001 | 0.0035 |
| 975 | 0.00012 | 0.00041 |

In an extra procedure, graphene-coated Nylon particles were immersed in a hydrogen peroxide-water solution (30% $H_2O_2$ in water) for 15 minutes to 2 hours. The products were graphene oxide sheets, having an oxygen content from 5 to 35% by weight, coated on Nylon particle surfaces. Oxidation of these graphene sheets at the edges and primary surfaces in a controlled manner can significantly improve the bonding between graphene sheets and a polymer matrix.

Example 2: Graphene Oxide from Expanded Graphite Via ABS Polymer

In an experiment, 100 grams of ABS pellets, as solid polymer particles, were placed in a 16 oz plastic container along with 5 grams of natural graphite. This container was placed in an acoustic mixing unit (Resodyn Acoustic mixer), and processed for 30 minutes. After processing, polymer particles were found to be coated with a thin layer of graphene.

Graphene-coated carrier particles were then immersed in a mixture of sulfuric acid and potassium permanganate (graphene/sulfuric acid/potassium permanganate ratio of 1.0/1.0/0.5) for oxidation of graphene to obtain GO sheet-coated ABS particles. The suspension was filtered using an appropriate filter and washed with distilled water. Subsequent to washing, filtrate was dried in a vacuum oven set at 60° C. for 2 hours.

It may be noted that the conventional Hummer's method typically requires the use of 24 mL (44 grams) of sulfuric acid and 5 grams of potassium permanganate to oxidize 1 gram of natural graphite. The required ratio was 1.0/44/5; i.e. significantly higher amounts of chemicals were used. Additionally, 15-30% of the natural graphite was "eaten away" during the GO production process using the Hummer's method.

Example 3: Functionalized Graphene from Mesocarbon Microbeads (MCMBs) Via Poly (Lactic Acid) or PLA In one example, 100 grams of PLA pellets (carrier material), 2 grams of MCMBs (China Steel Chemical Co., Taiwan), and 2 grams of carboxylic acid (an oxidizing agent) were placed in a vibratory ball mill, which also contains particles of magnetic stainless steel impactor and processed for 1 hour to obtain graphene oxide-coated PLA particles. Subsequently, DETA was added and the material mixture was processed for an additional 1 hour. The vibratory mill was then opened and the carrier material was found to be coated with a brown-color coating of graphene oxide. The magnetic steel particles were removed with a magnet. The graphene oxide-coated polymer particles were rinsed with isopropyl alcohol and then water. The dried graphene-coated polymer particles were then molded into proper composite specimens for measurements of electrical and mechanical properties.

In separate experiments, the following functional group-containing species were introduced to the graphene oxide sheets produced: an amino acid, sulfonate group (—$SO_3H$), 2-Azidoethanol, polyamide (caprolactam), and aldehydic group. In general, these functional groups were found to impart significantly improved interfacial bonding between resulting graphene oxide sheets and polyester, polyimide, polyamide matrix materials to make stronger polymer matrix composites. The interfacial bonding strength was semi-quantitatively determined by using a combination of short beam shear test and fracture surface examination via scanning electronic microscopy (SEM). Non-functionalized graphene sheets tend to protrude out of the fractured surface without any residual matrix resin being attached to graphene sheet surfaces. In contrast, the fractured surface of composite samples containing functionalized graphene oxide sheets do not exhibit any bare graphene sheets; any what appears to be graphene sheets were completely embedded in a resin matrix.

Example 4: Graphene-Coated Polyethylene Terephthalate (PET) from Highly Oriented Pyrolytic Graphite (HOPG) and Via Glass Beads and SPEX Mill In an experiment, 5 grams of glass beads and 20 grams of PET particles were placed in a SPEX mill sample holder (SPEX Sample Prep, Metuchen, N.J.) along with 0.25 grams of HOPG derived from graphitized polyimide. This process was carried out in a 1% "dry room" to reduce the condensation of water onto the completed product. The SPEX mill was operated for 10 minutes. After operation, some amount of the contents of the sample holder was transferred to a water bath subjected to ultrasonication, which helped to separate graphene sheets from PET particle surfaces. The resulting suspension was a mixture of single-layer graphene (86%) and few layer graphene dispersed in water.

A majority of the resulting graphene-coated PET powder was molded into polymer composite samples for property measurements.

Example 5: Metal Particles as the Impacting Balls and Thermoplastic Elastomers as Solid Polymer Particles In one example, 100 grams of a thermoplastic elastomer (thermoplastic polyurethane or styrene-butadiene block copolymer), 30 grams of tin (45 micron, 99.9% purity, Goodfellow Inc.; Coraopolis, Pa.), and 10 grams of vein graphite (40 mesh size, Asbury Carbons, Asbury N.J.) were mixed and loaded into a vibratory mill. The material was processed for 2 hours, and the vibratory mill was opened. The thermoplastic elastomer particles were found to be coated with few-layer graphene sheets. These graphene-coated polymer powders were molded into specimens for electrical property measurements.

The invention claimed is:

1. A polymer matrix composite containing graphene sheets homogeneously dispersed in a polymer matrix wherein said polymer matrix composite exhibits a percolation threshold from 0.0001% to 0.1% by volume of graphene sheets to form a 3D network of interconnected graphene sheets or network of electron-conducting pathways, wherein said polymer matrix exhibits an impact strength $E_p$ and said polymer matrix composite exhibits an impact strength $E_c$, and wherein $E_c/E_p$ is from 1.2 to 20.

2. The polymer matrix composite of claim 1, wherein said polymer matrix composite exhibits an electrical conductivity from $10^{-8}$ S/m to 2000 S/m when measured under the condition that said polymer matrix contains no other additive or reinforcement material than graphene sheets.

3. The polymer matrix composite of claim 1, wherein said polymer matrix composite, when made to contain 0.1% by volume of graphene sheets, has a room temperature electrical conductivity no less than $10^{-6}$ S/m.

4. The polymer matrix composite of claim 1, wherein said polymer matrix comprises a thermoplastic resin selected from polyethylene, polypropylene, polybutylene, polyvinyl chloride, poly(vinylidene fluoride), poly(tetrafluoroethylene), polyamide, polyimide, polyetherimide, polyethylene terephthalate, polybutylene terephthalate, polyphenylene sulfide, polyphenylene oxide, polysulfone, polyether sulfone, polybenzimidazole, polyvinyl acetate, polyvinyl alcohol, polycarbonate, polystyrene, poly(acrylonitrile-butadiene-styrene), poly (lactic acid), polyacrylate, poly (acrylate amide), poly(methyl methacrylate), polyoxymethylene, polyvinyl pyrrolidone, polyacrylic acid, a copolymer thereof, or a combination thereof.

5. The polymer matrix composite of claim 1, wherein said graphene sheets are selected from the group consisting of pristine graphene, graphene fluoride, graphene chloride, graphene bromide, graphene iodide, nitrogenated graphene, hydrogenated graphene, doped graphene, chemically functionalized graphene, or a combination thereof and wherein said graphene sheets do not include CVD graphene, graphene oxide (GO), and reduced graphene oxide (RGO) and said polymer matrix contains a thermoplastic resin selected from polyethylene, polypropylene, polybutylene, poly(tetrafluoroethylene), polyamide, polyimide, polyetherimide, polyethylene terephthalate, polybutylene terephthalate, polyphenylene sulfide, polyphenylene oxide, polysulfone, polyether sulfone, polybenzimidazole, polyvinyl acetate, polyvinyl alcohol, polycarbonate, polystyrene, poly(acrylonitrile-butadiene-styrene), poly (lactic acid), polyacrylate, poly(acrylate amide), poly(methyl methacrylate), polyoxymethylene, polyvinyl pyrrolidone, polyacrylic acid, a copolymer thereof, or a combination thereof.

6. The polymer matrix composite of claim 1, wherein said polymer matrix further comprises an additive, filler, or reinforcement material dispersed therein.

7. The polymer matrix composite of claim 1, wherein said graphene sheets comprise pristine graphene, graphene fluoride, graphene chloride, graphene bromide, graphene iodide, nitrogenated graphene, hydrogenated graphene, doped graphene, chemically functionalized graphene, or a combination thereof, wherein said pristine graphene does not include CVD graphene.

8. The polymer matrix composite of claim 7, wherein said chemically functionalized graphene contains a chemical functional group that is bonded to said polymer matrix.

9. The polymer matrix composite of claim 7, wherein said chemically functionalized graphene contains a chemical functional group selected from alkyl or aryl silane, alkyl or aralkyl group, hydroxyl group, carboxyl group, amine group, sulfonate group (—SO$_3$H), aldehydic group, quinoidal, fluorocarbon, or a combination thereof.

10. The polymer matrix composite of claim 7, wherein said chemically functionalized graphene contains a chemical functional group derived from an azide compound selected from the group consisting of 2-Azidoethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups,

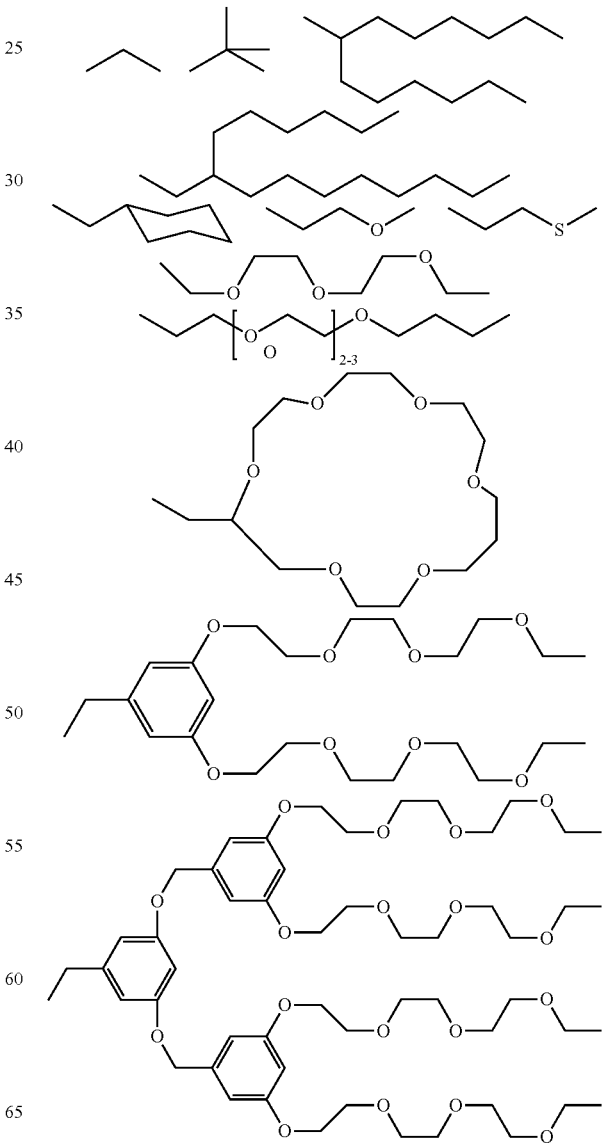

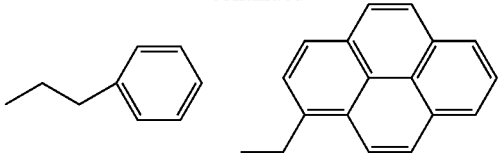

and combinations thereof.

11. The polymer matrix composite of claim 7, wherein said chemically functionalized graphene contains an oxygenated group selected from the group consisting of hydroxyl, peroxide, ether, keto, and aldehyde.

12. The polymer matrix composite of claim 7, wherein said chemically functionalized graphene contains a chemical functional group selected from the group consisting of $SO_3H$, COOH, $NH_2$, OH, R'CHOH, CHO, CN, COCl, halide, COSH, SH, COOR', SW, $SiR'_3$, $Si(-OR'-)_yR'_{3-y}$, $Si(-O-SiR'_2-)OR'$, R'', Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R'' is fluoroalkyl, fluoroaryl, fluorocycloalkyl, fluoroaralkyl or cycloaryl, X is halide, and Z is carboxylate or trifluoroacetate, and combinations thereof.

13. The polymer matrix composite of claim 7, wherein said chemically functionalized graphene contains a chemical functional group selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

14. The polymer matrix composite of claim 7, wherein said chemically functionalized graphene contains a chemical functional group selected from OY, NHY, O=C—OY, P=C—NR'Y, O=C—SY, O=C—Y, —CR'1—OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'2, R'SH, R'CHO, R' CN, R' X, $R'N^+(R')_3X^-$, $R'SiR'_3$, $R'Si(-OR'-)_yR'_{3-y}$, $R'Si(-O-SiR'_2-)OR'$, R'—R'', R'—N—CO, $(C_2H_4O-)_wH$, $(-C_3H_6O-)_wH$, $(-C_2H_4O)_w-R'$, $(C_3H_6O)_w-R'$, R', and w is an integer greater than one and less than 200; wherein y is an integer equal to or less than 3; wherein R' is hydrogen, alkyl, aryl, cycloalkyl, or aralkyl, cycloaryl, or poly(alkylether), R'' is fluoroalkyl, fluoroaryl, fluorocycloalkyl, fluoroaralkyl or cycloaryl, X is halide.

15. A method of producing the polymer matrix composite of claim 1, said method comprising: (a) mixing multiple particles of a graphitic material and multiple particles of a solid polymer material to form a mixture in an impacting chamber of an energy impacting apparatus; (b) operating said energy impacting apparatus with a frequency and an intensity for a length of time sufficient for peeling off graphene sheets from said graphitic material and transferring said graphene sheets to surfaces of said solid polymer material particles to produce graphene-coated solid polymer particles inside said impacting chamber; and (c) heating and consolidating said graphene-coated solid polymer particles to produce said polymer matrix composite.

16. The method of claim 15, wherein step (a) further comprises adding a plurality of impacting balls to the impacting chamber of said energy impacting apparatus and said method further comprises removing said impacting balls from graphene-coated solid polymer particles prior to said heating step.

17. The method of claim 15, wherein said step (a) further comprises adding an oxidizing liquid in said mixture so that said oxidizing liquid acts to partially oxidize said graphene sheets to produce graphene oxide during step (b).

18. The method of claim 17, wherein said oxidizing liquid is selected from a liquid containing an oxidizer selected from $H_2O_2$, nitric acid, potassium permanganate, sodium permanganate, transition metal permanganate, sodium chlorate, potassium chlorate, or a combination thereof.

19. The method of claim 15, wherein said graphitic material is selected from natural graphite, synthetic graphite, highly oriented pyrolytic graphite, graphite fiber, graphitic nanofiber, graphite fluoride, oxidized graphite, chemically modified graphite, exfoliated graphite, recompressed exfoliated graphite, expanded graphite, mesocarbon microbead, or a combination thereof.

20. The method of claim 15, wherein the energy impacting apparatus is a vibratory ball mill, planetary ball mill, high energy mill, basket mill, agitator ball mill, continuous ball mill, stirred ball mill, tumbler, rotating chamber mill, pressurized ball mill, freezer mill, vibratory sieve, ultrasonic homogenizer mill, or resonant acoustic mixer.

21. The method of claim 15, wherein said graphitic material in step (a) contains a non-intercalated and non-oxidized graphitic material that has never been previously exposed to a chemical or oxidation treatment prior to said mixing step.

22. The method of claim 15, wherein said graphitic material contains previously fluorinated, chlorinated, brominated, iodized, nitrogenated, or hydrogenated graphite or carbon material and the polymer matrix composite contains graphene fluoride, graphene chloride, graphene bromide, graphene iodide, nitrogenated graphene, or hydrogenated graphene dispersed therein.

23. The method of claim 15, wherein said graphene-coated solid polymer particles contain from 1 to 10 layers of graphene or 1 to 10 graphene planes embracing one of said polymer particles.

24. The method of claim 15, wherein said step (a) further comprises adding a chemical functionalizing agent to said mixture to functionalize said graphene sheets.

25. The method of claim 24, wherein said functionalizing agent contains a chemical functional group selected from alkyl or aryl silane, alkyl or aralkyl group, hydroxyl group, carboxyl group, amine group, sulfonate group ($-SO_3H$), aldehydic group, quinoidal, fluorocarbon, or a combination thereof.

26. The method of claim 15, wherein said functionalizing agent contains an azide compound selected from the group consisting of 2-Azidoethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups,

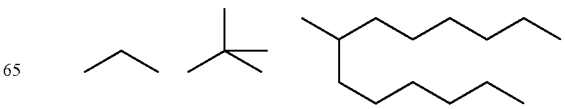

-continued

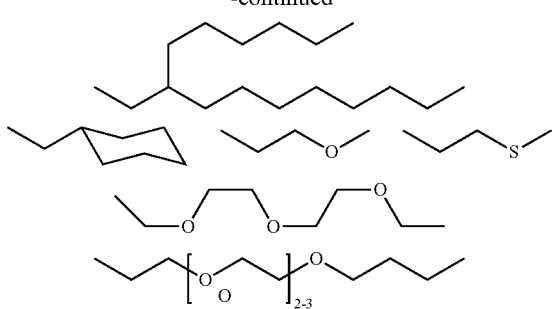
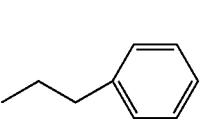
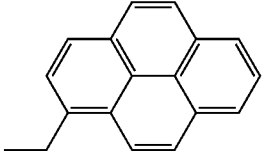
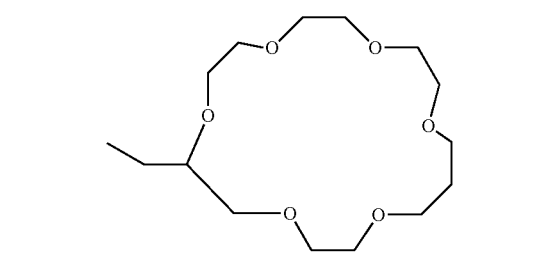
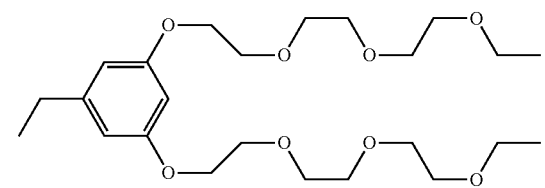
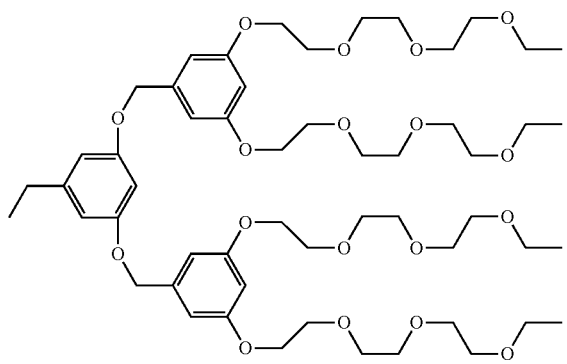

and combinations thereof.

27. The method of claim 24, wherein said functionalizing agent contains an oxygenated group selected from the group consisting of hydroxyl, peroxide, ether, keto, and aldehyde.

28. The method of claim 24, wherein said functionalizing agent contains a functional group selected from the group consisting of $SO_3H$, COOH, $NH_2$, OH, R'CHOH, CHO, CN, COCl, halide, COSH, SH, COOR', SR', $SiR'_3$, $Si(-OR'-)_yR'_{3-y}$, $Si(-O-SiR'_2-)OR'$, R", Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, and combinations thereof.

29. The method of claim 24, wherein said functionalizing agent contains a functional group is selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

30. The method of claim 24, wherein said functionalizing agent contains a functional group selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R' SH, R'CHO, R' CN, R' X, $R'N^+(R')_3X^-$, $R'SiR'_3$, $R'Si(-OR'-)_yR'_{3-y}$, $R'Si(-O-SiR'_2-)OR'$, R'—R", R'—N—CO, $(C_2H_4O-)_wH$, $(-C_3H_6O-)_wH$, $(-C_2H_4O)_w-R'$, $(C_3H_6O)_w-R'$, R', and w is an integer greater than one and less than 200; wherein R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide; wherein y is an integer equal to or less than 3.

31. The method of claim 15, wherein said procedure of operating said energy impacting apparatus is conducted in a continuous manner using a continuous energy impacting device.

* * * * *

UNITED STATES PATENT AND TRADEMARK OFFICE
CERTIFICATE OF CORRECTION

PATENT NO. : 10,971,281 B2
APPLICATION NO. : 16/200941
DATED : April 6, 2021
INVENTOR(S) : Yi-jun Lin et al.

It is certified that error appears in the above-identified patent and that said Letters Patent is hereby corrected as shown below:

Column 23, Line 19, Claim 12 should read:
halide, COSH, SH, COOR', SR', $SiR'_3$, $Si(\text{--}OR'\text{--})_y R'_{3-y}$, Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*